(12) United States Patent
Zhou et al.

(10) Patent No.: US 8,988,670 B2
(45) Date of Patent: Mar. 24, 2015

(54) APPARATUS FOR SIMULTANEOUSLY INSPECTING AND CLEANING FIBER CONNECTOR

(71) Applicant: Lightel Technologies Inc., Renton, WA (US)

(72) Inventors: Ge Zhou, Renton, WA (US); Shangyuan Huang, Kent, WA (US); Pai-Sheng Shen, Bellevue, WA (US)

(73) Assignee: Lightel Technologies Inc., Renton, WA (US)

( * ) Notice: Subject to any disclaimer, the term of this patent is extended or adjusted under 35 U.S.C. 154(b) by 0 days.

(21) Appl. No.: 14/214,825

(22) Filed: Mar. 15, 2014

(65) Prior Publication Data

US 2014/0268114 A1 Sep. 18, 2014

Related U.S. Application Data

(60) Provisional application No. 61/789,910, filed on Mar. 15, 2013.

(51) Int. Cl.
*G01N 21/00* (2006.01)
*G01M 11/00* (2006.01)
*B08B 1/00* (2006.01)
*B08B 5/02* (2006.01)
*G02B 6/38* (2006.01)

(52) U.S. Cl.
CPC ............ *G01M 11/31* (2013.01); *B08B 1/00* (2013.01); *B08B 5/02* (2013.01); *G02B 6/3866* (2013.01); *B08B 2240/02* (2013.01)

USPC ............................................. 356/73.1

(58) Field of Classification Search
CPC .......... G01M 11/3145; G01M 11/335; G01M 11/33; G01M 11/3109; G01M 11/338
USPC ............................................. 356/73.1
See application file for complete search history.

(56) References Cited

U.S. PATENT DOCUMENTS 6,466,366 B1 * 10/2002 Dominique ............. 359/379
7,356,236 B1 * 4/2008 Huang et al. ............. 385/134

* cited by examiner

*Primary Examiner* — Tarifur Chowdhury
*Assistant Examiner* — MD Rahman
(74) *Attorney, Agent, or Firm* — Pai Patent & Trademark Law Firm; Chao-Chang David Pai

(57) ABSTRACT

The fiberscope for inspecting and cleaning a fiber connector simultaneously includes a housing with a front panel, a microscope system, a connector holder mounted at a distance from the front panel for receiving a connector ferrule of a fiber connector, and a translation stage for moving the microscope system transversely to align its optical axis with the connector ferrule. The fiberscope further includes a hand knob attached to a fine screw through the connector holder for adjusting the vertical position of the connector ferrule, a mirror pivotally mounted between the connector holder and the front panel, an LED lamp, air nozzles attached to the front panel, and a cleaning air tube for supplying compressed air to the air nozzles. The cleaning air from the air nozzles spray sideways onto the fiber endfaces so that the cleaning air bounces off sideways to avoid secondary contamination.

18 Claims, 7 Drawing Sheets

APPARATUS FOR SIMULTANEOUSLY INSPECTING AND CLEANING FIBER CONNECTOR

CROSS REFERENCE TO RELATED APPLICATIONS

This application claims the benefit of U.S. Provisional Application No. 61/789,910, filed Mar. 15, 2013, the entirety of which is incorporated by reference herein.

BACKGROUND OF THE INVENTION

1. Field of the Invention

The invention relates to fiber connector inspectors and more particularly to an apparatus designed for simultaneously inspecting and cleaning the endface of the fiber connector.

2. Description of the Related Art

Fiber optics communication has been the dominant and widespread means for modern-day telecommunications. Fiber connectors are one of the key components of the fiber optics communication system. Any defect, scratch or contamination on the endface of a fiber connector can cause failure of a fiber optics component or failure of the entire fiber optics communication system. Therefore, it is important that the endface of every fiber connector be inspected, and cleaned when necessary, at both the manufacturer site and the user site.

The international standard, IEC 61300-3-35, provides methods for quantitatively assessing the endface quality of a polished optical fiber connector. According to this standard, a fiber endface must be examined against the acceptance criteria. If a fiber fails the inspection, the user shall clean the fiber endface and redo the inspection. Inspecting and cleaning shall be repeated until the connector is finally determined to pass or fail.

Many apparatuses have been designed for inspecting and cleaning fiber connectors. Most of them only support independent inspection or cleaning actions, such as those shown in U.S. Pat. No. 6,751,017, U.S. Pat. No. 7,312,859, U.S. Pat. No. 7,336,884, U.S. Pat. No. 8,104,976, and U.S. Pat. No. 8,429,784. There are apparatuses, as shown in U.S. Pat. No. 7,356,236 and U.S. Pat. Pub. No. 2013/0229650, that integrate the functions of inspection and cleaning into one equipment, however, the inspection and cleaning with those apparatuses are still separately performed. In the U.S. Pat. No. 7,356,236, the optical fiber connector should first be inserted into the microscope for inspection and then be removed for cleaning, if necessary, on the attached cleaning kit. Since the cleaning result is not known without going through another inspection, this connector has to be inserted back into the microscope again, and so on. An alternative method is described in U.S. Pat. App. No. 2013/0229650, in which the fiber microscope and the cleaner are moved in and out the working spot instead of the fiber connector, thereby allowing the fiber connector to stay in position during the inspection and cleaning procedure.

U.S. Pat. No. 7,566,176 describes a design of an optical fiber endface cleaning apparatus for the fiber connector located in the adapter that is arranged on the backplane of a communication equipment. It mentions incorporating an inspection microscope within the cleaning apparatus to monitor the cleaning situation. However, this cleaning apparatus has a complicated design and requires a special dispensing assembly for the cleaning. It also requires an evacuation channel to remove the cleaning solvent in order to avoid secondary contamination. Due to the limitations of the apparatus, the connector endface cannot be cleaned manually.

It is the objective of the present invention to provide a fiberscope that allows the fiber connector to be inspected and cleaned simultaneously without repeated insertion and removal of the fiber connector, and also without the need of alternatively moving the microscope and cleaner in and out the working scene.

BRIEF SUMMARY OF THE INVENTION

Figure 1:
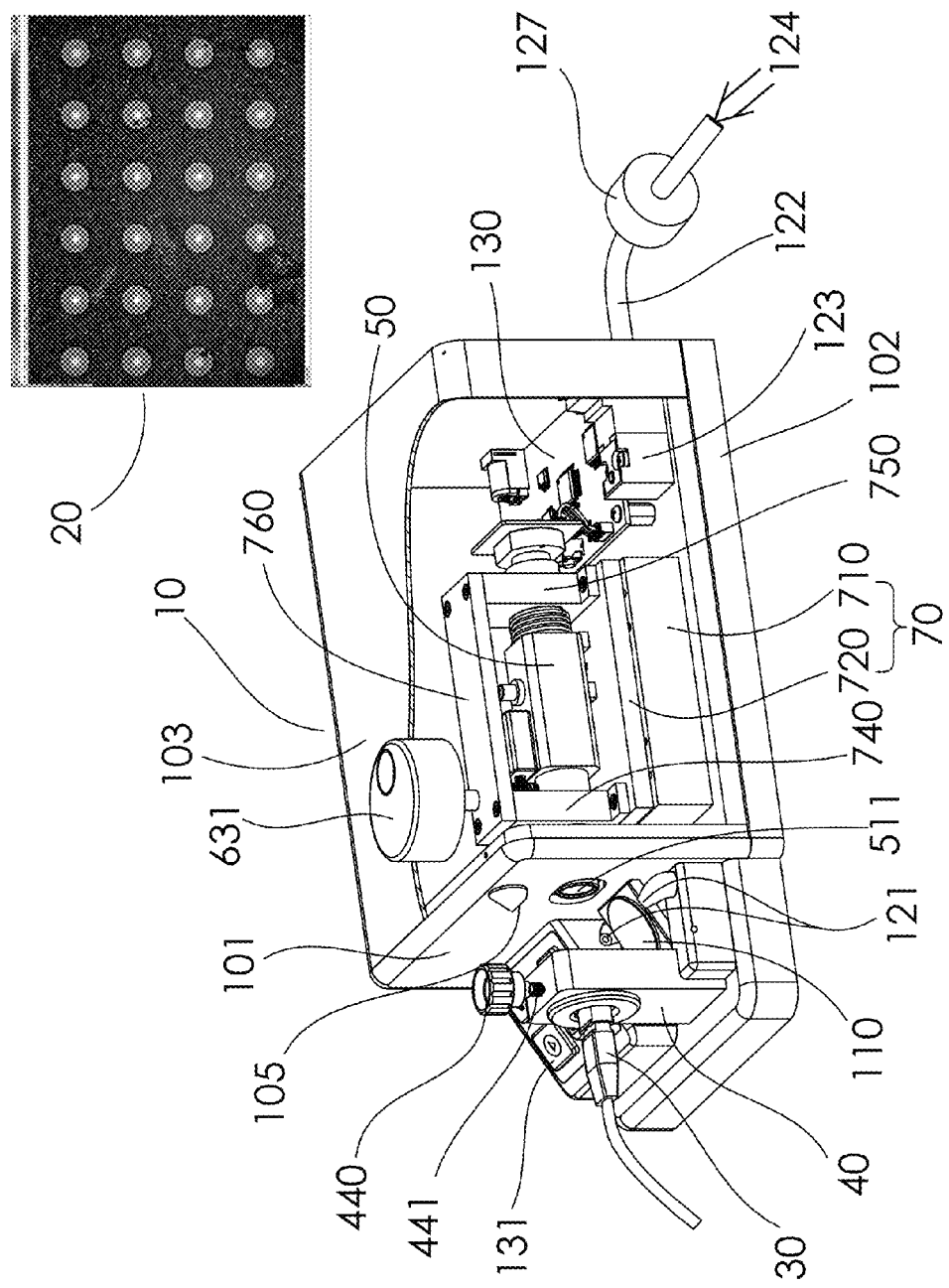
FIG. 1 shows a perspective cut-out view of an embodiment of the fiberscope according to the present invention.

The fiberscope of the present application allows a fiber connector to be inspected and cleaned simultaneously without having to repeatedly inserting and removing the fiber connector to and from the fiberscope, and without having to repeatedly move the microscope and cleaner in and out the working scene by turns.

The fiberscope comprises a housing having a base plate and a front panel, a microscope system disposed inside the housing, a connector holder mounted on the base plate at a certain distance in front of the front panel (thus defining an open access space between the connector holder and the front panel) for receiving and holding a connector ferrule of an optical fiber connector in a connector receptacle embedded in the connector holder, and a translation stage disposed inside the housing and coupled with the microscope system for moving the microscope system transversely to align the optical axis of the microscope system with the connector ferrule of the fiber connector.

In the fiberscope, the front window of the objective of the microscope system is exposed through an opening in the front panel of the housing, and the ferrule endface and the fiber endfaces of the fiber connector are exposed in a rear window of the connector receptacle, facing the front window of the objective of the microscope system. The connector receptacle of the connector holder is substantially aligned with the optical axis of the microscope system to allow the translation stage to properly align the optical axis of the microscope system with the ferrule endface along a horizontal track. In particular, the translation stage comprises a stationary portion, a moving platform, and a stepper motor, wherein the microscope system is mounted on the moving platform and the stepper motor is able to move the moving platform transversely relative to the connector holder.

The fiberscope further includes a hand knob attached to a fine screw that extends through a top side of the connector holder to interact with the connector receptacle of the connector holder, such that the hand knob may be turned to adjust the vertical position of the connector receptacle and therefore the connector ferrule of the fiber connector received therein for properly aligning the ferrule endface with the optical axis of the microscope system along a vertical track.

The microscope system of the fiberscope may further include a beam splitter and a condenser lens for illumination light from a connected LED light source.

The microscope system is equipped with two ways of focusing: manual focusing and auto-focusing. The user may first use auto-focusing, then manual focusing to zero in on the focus for individual fiber endfaces.

The fiberscope further comprises a mirror pivotally mounted in the open access space between the connector holder and the front panel of the housing, an LED lamp mounted on the front panel, at least one air nozzle attached to the front panel, and a cleaning air tube extending from the at least one air nozzle, for connecting to a clean and dry compressed air supply to supply cleaning air to the at least one air nozzle.

The angle of the mirror may be adjusted for a user of the fiberscope to view the ferrule endface and the fiber endfaces of the fiber connector, with the LED lamp illuminating the endfaces.

The at least one air nozzle is disposed at an angle from the ferrule endface of the fiber connector to allow the cleaning air from the at least one air nozzle to spray sideways onto the ferrule endface (and the fiber endfaces embedded in the ferrule endface) of the fiber connector received in the connector holder. This way, after contacting the endfaces, the cleaning air will bounce off sideways out of the open access space between the connector holder and the front panel to avoid secondary contamination.

DETAILED DESCRIPTION OF THE INVENTION

The present invention will be described in detail in view of the accompanying drawings.

Figure 2:
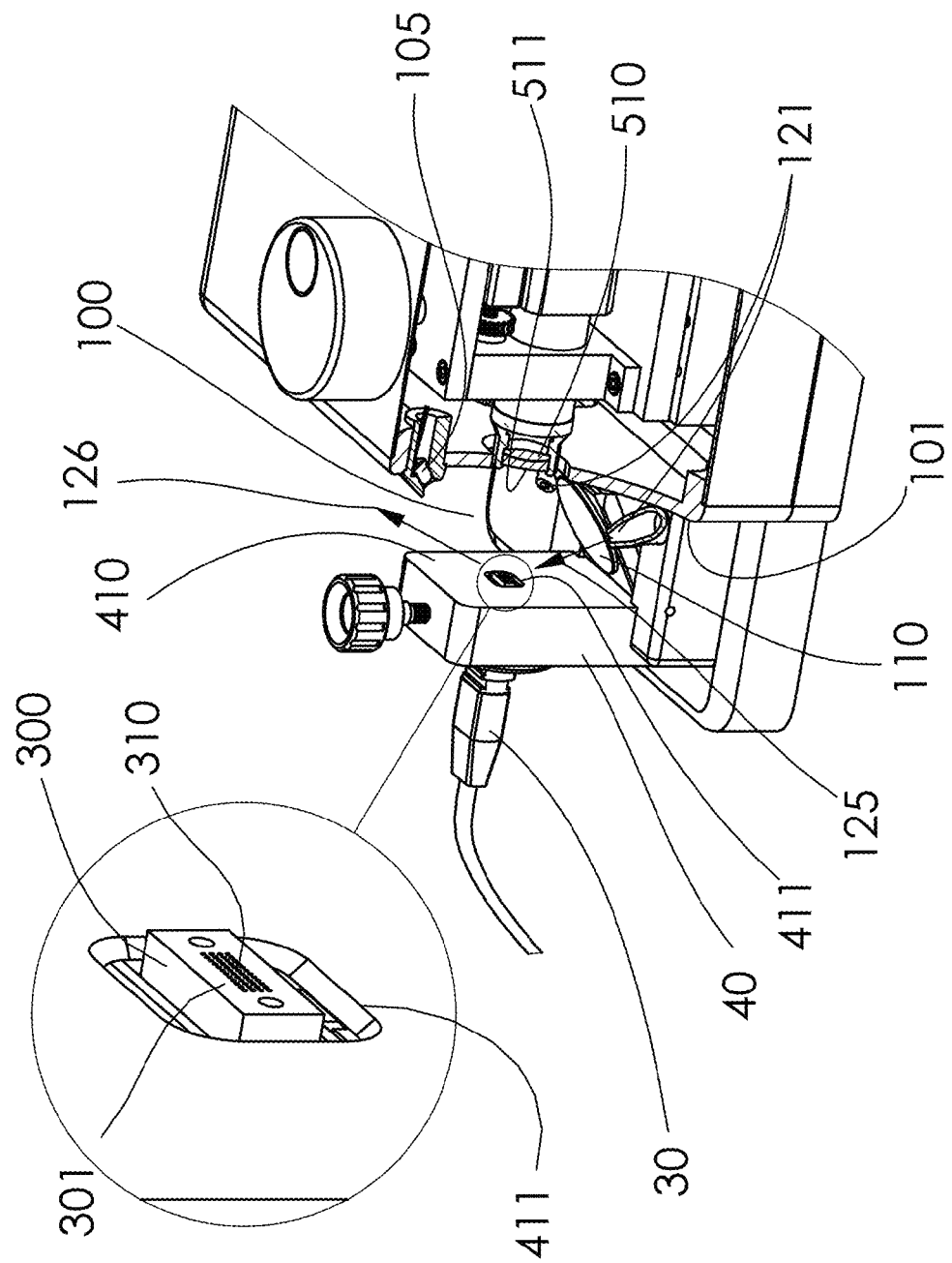
FIG. 2 shows the fiberscope of FIG. 1 as viewed from a different angle and with an enlarged view of the endface of the fiber connector inserted in the connector holder of the fiberscope.
Figure 3:
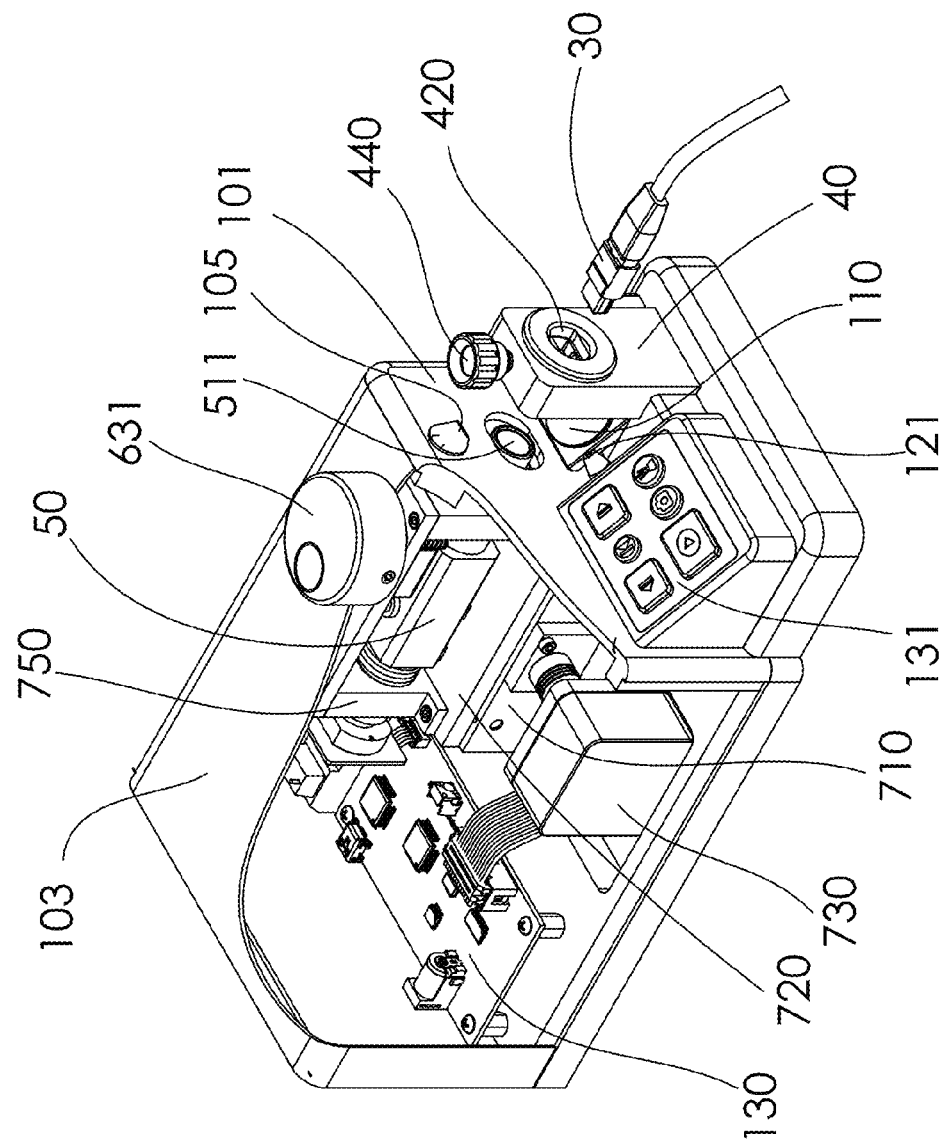
FIG. 3 shows a perspective cut-out view of the embodiment the fiberscope as viewed from a different angle than for FIG. 1.

FIGS. 1-3 show a perspective cut-out view of an embodiment of the fiberscope 10 for simultaneously inspecting and cleaning a fiber connector according to the present invention. The fiberscope 10 allows an optical fiber connector to be inspected and cleaned simultaneously without the need to repeatedly insert and remove the connector.

As illustrated in FIGS. 1-3, the fiberscope 10 according to the present invention includes a housing with a front panel 101, a top cover 103, and a base plate 102 connected to the lower portion of the front panel 101; a microscope system 50 disposed inside the housing; a connector holder 40 mounted on the base plate 102 at a certain distance in front of the front panel 101, thus defining an open access space 100 between the connector holder 40 and the front panel 101; a mirror 110 pivotally mounted in the open access space 100 between the connector holder 40 and the front panel 101; an LED lamp 105 attached to the front panel 101; one or more air nozzles 121 attached to the front panel 101; and a cleaning air tube 122 extending from the back end of the air nozzles 121, through the inside of the housing, for connecting to an external compressed air source (not shown).

When a fiber connector 30 is to be inspected or cleaned, it is inserted into a connector receptacle 420 in the connector holder 40 with its ferrule endface 301 and fiber endfaces 310 in the ferrule endface 301 exposed through a rear window 411 of the receptacle 420 on the rear side 410 of the connector holder 40. The rear side 410 is the surface of the connector holder 40 that faces the front panel 101 of the housing.

In this embodiment, the microscope system 50 includes a main body 502, a front cylindrical tube 503 at the front side of the main body 502, a rear cylindrical tube 504 at the rear side of the main body 502, and a camera 530 attached to the rear end of the rear cyclindrical tube 504. The camera 530 can be a CCD or CMOS camera, though not limited to the two, and is attached to the rear cylindrical tube 504 through a fitting joint 508.

Figure 5:
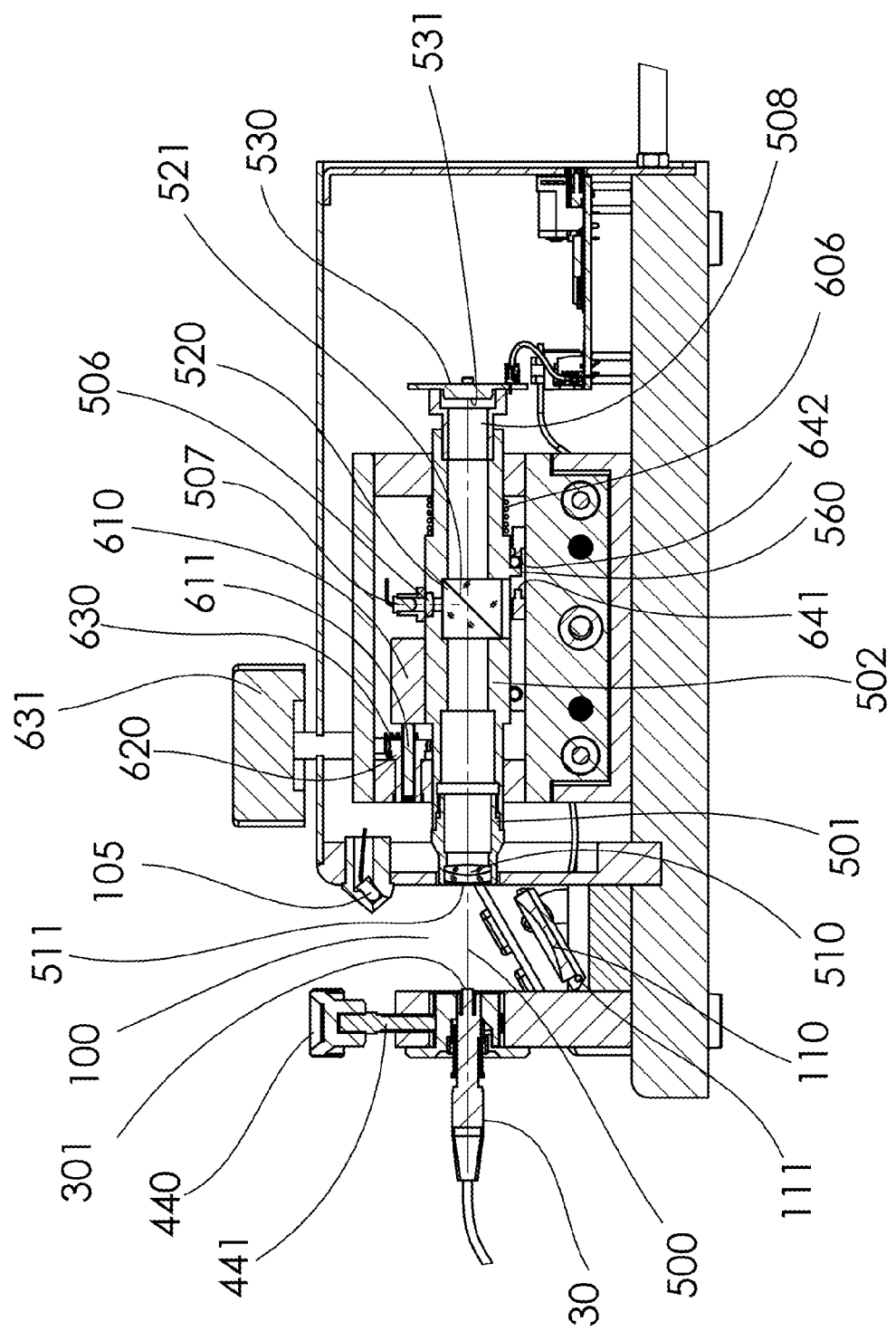
FIG. 5 shows a side cross-section view of the fiberscope according to the present application.
Figure 6:
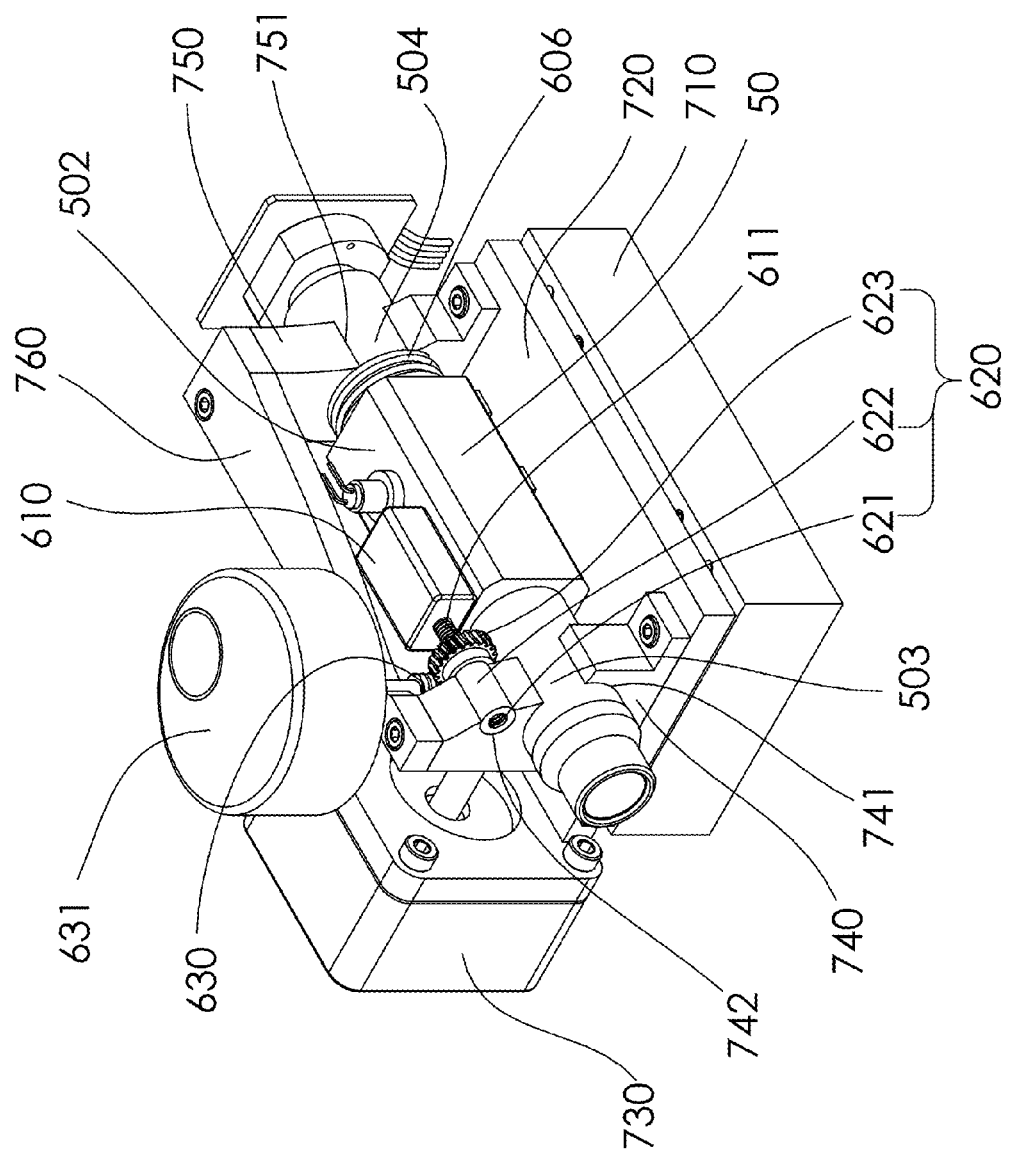
FIG. 6 shows a perspective view of the microscope system to illustrate the mechanism for auto and manual focusing mechanism according to the present application.

As illustrated in FIGS. 5 and 6, the microscope system 50 is supported on a supporting rack, which includes a front vertical part 740, a horizontal part 760, and a rear vertical part 750 connected between the upper ends of the front vertical part 740 and the rear vertical part 750. The front window 511 of the objective 510 of the microscope system 50 is exposed through an oval (or elongated) opening formed in the front panel 101. The optical axis 500 of the microscope system extends from the front window 511 of the objective 510 to the camera sensor 531 of the camera 530. The optical axis 500 is substantially aligned with the rear window 411 of the connector receptacle 420 of the connector holder 40. The oval or elongated opening on the front panel 101 allows the microscope system 50 to horizontally pan over the ferrule endface 301 to take image of every fiber endface 310 of the fiber connector 30 for inspection. The objective 510 is an optical system with a relatively longer work distance—25 mm in this embodiment.

Furthermore, as illustrated in FIG. 5, a condenser lens 506 with an LED light source 507 and a beam splitter 520 with a beam splitting surface 521 may be provided inside the main body 502 across the optical axis 50. The beam splitting surface 521 reflects the light from the LED light source 507 and through the condenser lens 506 towards the rear window 411 of the connector receptacle 420 to illuminate the fiber endfaces 310 and ferrule endface 301 received therein; the beam splitting surface 521 at the same time allows the light reflected back from the endfaces 301/310 to pass through towards the camera 530.

Inset in FIG. 1 is an image 20 of the fiber endfaces 310 of the fibers of the fiber connector 30, as is captured by the microscope system 50 and displayed on a video monitor or a TV display connected to the camera 530. The fiber connector 30 shown in FIG. 1 is a multi-fiber connector (more specifically, an MTP/MPO connector with 4 rows), however, it can be of any other type or style of fiber connector for the fiberscope 10 of the present application to inspect.

An open access space 100 is maintained between the rear side 410 of the connector holder 40 and the front window 511 of the objective 510 of the microscope system 50 so that the fiber endfaces 310 may be conveniently cleaned (e.g. with a cotton swab) without removing the fiber connector 30 from the connector holder 40. The clearance between the front window 511 of the objective 510 and the rear side of the connector holder 40 is essentially equal to the work distance of the objective 510 of the microscope system 50. In this preferred embodiment, the clearance is set to 25 mm. With such a clearance, a cotton swab consisting of a small wad of cotton on the end of a short rod may be maneuvered in the open access space 100 to clean the fiber endfaces 310 exposed in the rear side 410 of the connector receptacle 420. Certainly other suitable cleaning means may be used.

The mirror 110 is pivotally mounted, for example on a hinge 111, between the front panel 101 of the housing and the rear side 410 of the connector holder 40 at a certain angle The angle of the mirror 110 and the reflected image of the endfaces 301/310 may be easily adjusted. The arrangement allows the operator of the fiberscope 10 to turn the mirror 110 to a suitable angle to view the endfaces 301/310 of the fiber connector 30. The mirror 110 may be a plane mirror or a concave mirror.

The LED lamp 105 attached to the front panel 101 of the housing is positioned for lighting the ferrule endface 301 and the fiber endfaces 310 of the fiber connector ferrule 300.

The air nozzles 121 are attached to the front panel 101 of the housing for providing clean, dry, compressed air 124 through a cleaning air tube 122. The cleaning air tube 122 may be equipped with an air filter 127 and an electromagnetic valve 123 inside the housing. The cleaning air tube 122 extends through the inside of the housing to the air nozzles 121 on the front panel 101 of the housing to spray onto the ferrule endface 301 and fiber endfaces 310 of the fiber connector 30. If the endfaces 301/310 are cleaned with a wet cleaning technique, the cleaning air may be used to dry the endfaces 301/310 of the fiber connector 30, and blow away contaminants on the endfaces 301/310. Although two air nozzles 121 are shown in the drawings, the fiberscope 10 of the present invention may be installed with one, three or more air nozzles 121. The compressed air 124 may be provided directly from a compressed air tank. As illustrated in FIG. 2, each of the air nozzles 121 are mounted at an off-center position on the front panel 101. As result, the cleaning air 125 from the air nozzles 121 is blown sideways at the endfaces 301/310 (at a certain angle) so that the cleaning air after contacting the endfaces 301/310 will bounce off sideways (e.g. in the direction 126) out of the open access space 100 between the connector holder 40 and the front panel 101 to prevent the endfaces 301/310 from secondary contamination.

As illustrated in FIG. 2, the fiber connector 30 is received in the connector holder 40 such that the ferrule endface 301 projects slightly out of the rear side 410 of the connector holder 40. This is to prevent the cotton swab (or other cleaning tools or media) from touching the rear side 410 of the connector holder 40 while cleaning the fiber endfaces 310. Alternatively, the ferrule endface 301 may be flush with the rear side 410 of the connector holder 40.

In order to properly align the optical axis 500 of the microscope system 500 with any row of an multi-row fiber connector, the fiberscope 10 further comprises a hand knob 440 fixed to a fine screw 441 that extends through the top side of the connector holder 40. The fine screw 441 is such that it interacts with the receptacle 420 of the connector holder 40 to cause the receptacle 420 to shift position up or down. Thus, by turning the knob 440, one can adjust the vertical position of the receptacle 420 and therefore the vertical position of the endfaces 301/310 of the fiber connector 30 received in the receptacle 420, in order to properly focus the optical axis 500 in a vertical track.

As illustrated in FIGS. 1, 3 and 6, the fiberscope 10 is further equipped with a translation stage 70 for moving the microscope system 50 transversely (i.e. in a direction perpendicular to the optical axis 500) relative to the rear side 410 of the connector holder 40. The translation stage 70 includes a stationary portion 710 fixed on the base plate 102 of the housing, a moving platform 720 movably disposed above the stationary portion 710, and a stepper motor 730 connected to one side of the stationary portion 710 for driving the moving platform 720 to move transversely relative to the stationary portion 710. The aforementioned supporting rack for supporting the microscope system 50 is fixedly mounted on top of the moving platform 720 via the front vertical part 740 and the rear vertical part 750. Therefore, when the moving platform 720 is moved by the stepper motor 730, the microscope system 50 supported on the supporting rack will be moved altogether.

Figure 4:
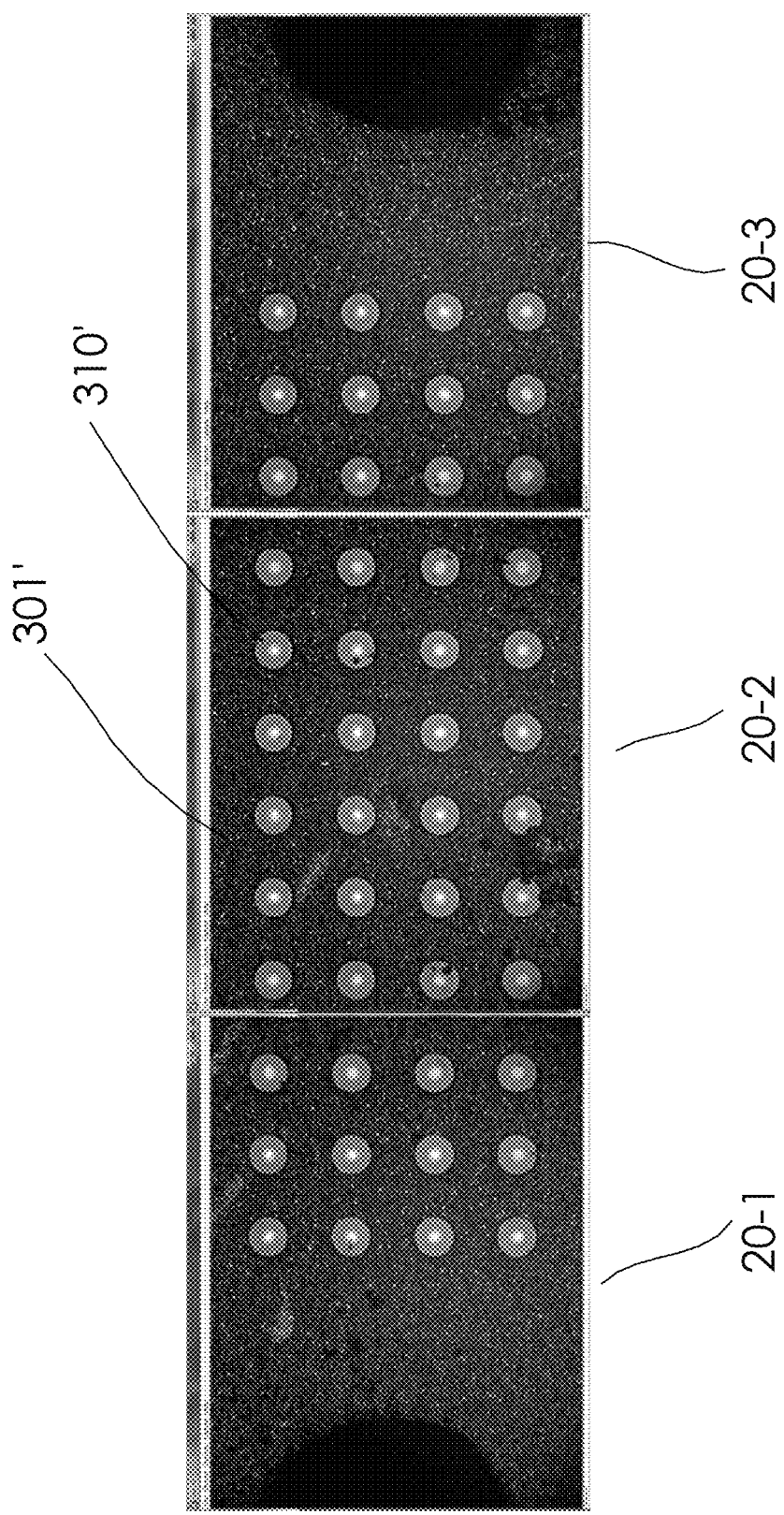
FIG. 4 shows the endface images of a multi-fiber connector having four rows of optical fibers on a display monitor. The images were captured by the fiberscope of the present invention at three consecutive transverse positions.

FIG. 4 shows the image 301' of the ferrule endface 301 and the image 310' of the fiber endfaces 310 of a multi-fiber connector having four rows of optical fibers, as viewed by the fiberscope 10 of the present invention at three consecutive horizontal panning positions. Specifically, three frames of images 20-1, 20-2 and 20-3 are shown for a 12×4 (Row) MTP/MPO Connector. The three frames of image may be pieced together on a computer display to show the whole endface of the MTP/MPO connector in one picture.

The microscope system 50 is equipped with two mechanisms of focusing: manual focusing and auto-focusing. Manual focusing is illustrated in FIG. 6. Essentially a hand knob 631 is provided outside the top cover 103 of the housing and connected to the worm 630 which is supported by the horizontal part 760 of the supporting rack for a user to do manual focusing. The mechanism will be described in more detail below, although the fiberscope 10 of the present application is not limited to any particular manual focusing mechanism.

A circular opening 741 is formed through the front vertical part 740 of the supporting rack for receiving the front cylindrical tube 503 of the microscope system 50, and a circular opening 751 is formed through the rear vertical part 750 of the supporting rack for receiving the rear cylindrical tube 504 of the microscope system 50. The circular openings 741 and 751 are formed such that the front cylindrical tube 503 and the rear cylindrical tube 504 can slide freely in the respective openings 741/751. A smaller circular opening 742 is formed through the front vertical part 740 of the supporting rack above the circular opening 741. The circular opening 742 receives the front tube 622 of the worm gear 620 while allowing the tube 622 of the worm gear 620 to turn freely.

A stepper motor 610 is fixedly set on top of the main body 502 of the microscope system 50. The driving screw 611 of the stepper motor 610 is connected to a worm gear assembly 620 having a gear 623 and a tube 622 fixedly attached to the middle of the front side of the gear 623; the tube 622 has an internal thread 621 matching the thread of the driving screw 611. A worm 630 connected to the hand knob 631 and meshed with the gear 623 of the worm gear assembly 620. The driving screw 611 of the stepper motor 610 passes through the middle opening of the gear 623 to the matching internal thread 621 of the tube 622. Furthermore, a compression spring 606 is disposed around the rear cylindrical tube 504 of the microscope system 50, and is set between the rear side of the main body 502 of the microscope system 50 and the front side of the rear vertical part 750 of the supporting rack so that the main body 502 of the microscope system 50 is constantly pushed forward by the compression spring 606 and the gear 623 is constantly pushed against the rear side of the front vertical part 740. Thus, when the hand knob 631 is turned, the worm 630 will turn the gear 623, which then turns the tube 622, shifting the driving screw 611 forward or backward, thus moving the main body 502 of the microscope system 50 forward or backward to accomplish focusing. This allows the user of the fiberscope 10 to manually focus the microscope system 50. It is noted that while manually focusing, the stepper motor 610 is locked and the driving screw 611 is kept stationary inside the stepper motor 610.

Alternatively, the stepper motor 610 may be operated to accomplish auto-focusing. While auto focusing, the stepper motor 610 drives the driving screw 611 to rotate while the worm gear assembly 620 is not turned. The basic theory of auto-focusing is will not be covered here. However, a mechanism is devised for the fiberscope 10 of the present application to keep the auto-focusing within an effective focusing range between two focusing limits. This auto-focusing mechanism will be described below, although the fiberscope 10 of the present application is not limited to any particular auto-focusing mechanism.

Figure 7:
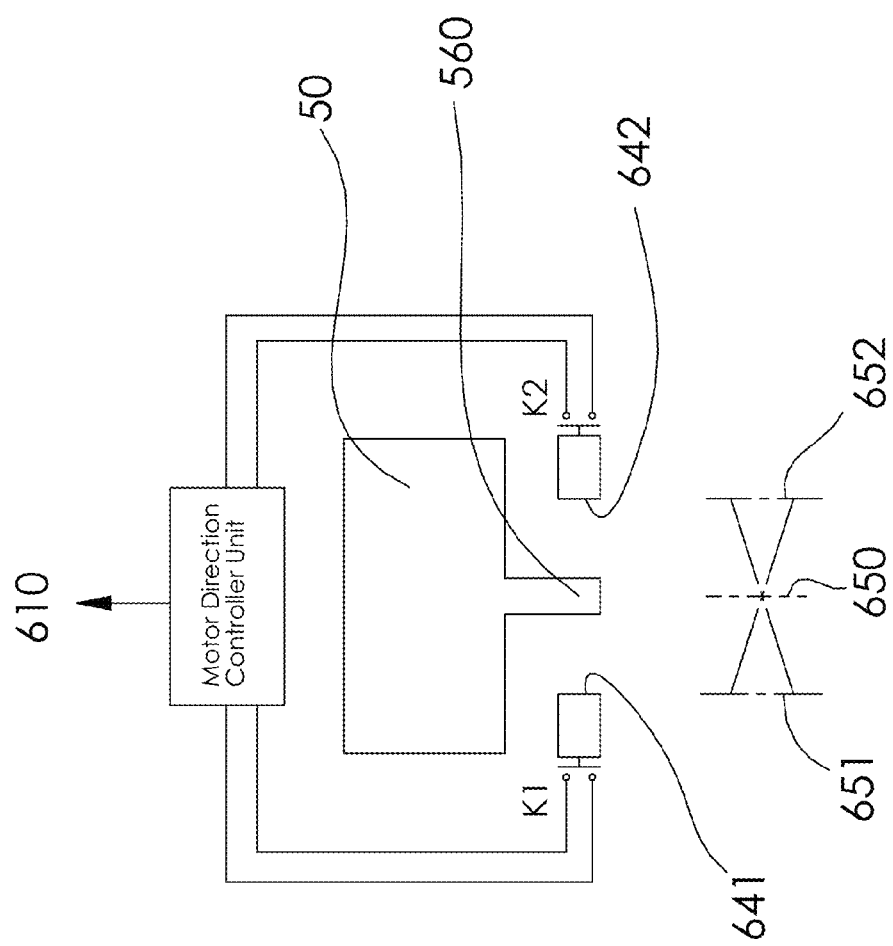
FIG. 7 is a sketch illustrating the auto-focus design and function of the microscope system according to the present application.

As illustrated in FIGS. 5 and 7, the main body 502 of the microscope system 50 is normally positioned at a normal focus position 650. The main body 502 is provided with a protruding triggering arm 560 for interacting with two focus limit switches 641 and 642. As the main body 502 is driven forward by the stepper motor 610 to find the focus, once the protruding triggering arm 560 hits the focus limit switch 641 without finding the focus, a signal will be sent to a motor direction controller unit, which then sends a signal to the stepper motor 610 to reverse the stepper motor 610 to drive the main body 502 in the rearward direction. Similarly, as the main body 502 is driven rearward, once the protruding triggering arm 560 hits the focus limit switch 642 without finding the focus, a signal will be sent to the motor direction controller unit, which then sends a signal to the stepper motor 610 to reverse the stepper motor 610 to drive the main body 502 in the forward direction. It is noted that the two focus limit switches 641 and 651 correspond to the two focusing limits 651 and 652, respectively.

Normally, the user first relies on auto-focusing to focus the microscope system 50 on the fiber endfaces 310, then, if necessary, uses manual focusing to zero in on the focus for individual fiber endfaces 310, or another interesting spot on the ferrule endface 301.

A control panel 131 is disposed in front of the front panel 101 of the housing. The control panel 131 is connected with the control circuit 130 installed inside the housing.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. An apparatus for simultaneously inspecting and cleaning a fiber connector, comprising:
   a housing having a base plate and a front panel, the front panel having a lower portion connected to the base plate;
   a microscope system embedded inside the housing, wherein the microscope system has an objective, an optical axis, and a camera, wherein a front window of the objective is exposed through an opening in the front panel; and
   a connector holder disposed at a certain distance in front of the front panel, defining an open access space between the connector holder and the front panel, the connector holder having a connector receptacle embedded therein for receiving and holding a connector ferrule of a fiber connector so that a ferrule endface of the connector ferrule and fiber endfaces in the ferrule endface are exposed in a rear window of the connector receptacle, facing the front panel, wherein the connector receptacle is substantially aligned with the optical axis of the microscope system so that the ferrule endface and the fiber endfaces of the fiber connector may be viewed and inspected through the microscope system and cleaned via the open access space;
   at least one air nozzle attached to the front panel of the housing at an off-center location; and
   a cleaning air tube extending from the at least one air nozzle, for connecting to an external clean and dry compressed air supply to supply cleaning air to the at least one air nozzle, wherein the at least one air nozzle is disposed to allow the cleaning air therefrom to spray sideways onto the ferrule endface of the fiber connector received in the connector holder and then bounce off the ferrule endface sideways out of the open access space between the connector holder and the front panel of the housing.

2. The apparatus for simultaneously inspecting and cleaning a fiber connector of claim 1, further comprising:
   a mirror pivotally mounted in the open access space between the connector holder and the front panel of the housing, wherein the angle of the mirror is adjustable for viewing the ferrule endface in the mirror.

3. The apparatus for simultaneously inspecting and cleaning a fiber connector of claim 1, further comprising:
   an LED lamp mounted on the front panel for illuminating the ferrule endface of the fiber connector.

4. The apparatus for simultaneously inspecting and cleaning a fiber connector of claim 1, further comprising:
   a mirror pivotally mounted in the open access space between the connector holder and the front panel of the housing, wherein the angle of the mirror is adjustable for viewing the ferrule endface in the mirror; and
   an LED lamp mounted on the front panel for illuminating the ferrule endface of the fiber connector.

5. The apparatus for simultaneously inspecting and cleaning a fiber connector of claim 1, further comprising:
   a translation stage disposed inside the housing and coupled with the microscope system for moving the microscope system and the optical axis thereof transversely relative to the connector receptacle of the connector holder to allow the optical axis to be aligned with any selected point along a horizontal track on the ferrule endface of the fiber connector.

6. The apparatus for simultaneously inspecting and cleaning a fiber connector of claim 5, further comprising a hand knob attached to a fine screw that extends through a top side of the connector holder to interact with the connector receptacle of the connector holder, such that the connector receptacle is gradually raised or lowered by turning the hand knob for aligning the ferrule endface of the fiber connector received in the connector receptacle with the optical axis of the microscope system along a vertical track.

7. The apparatus for simultaneously inspecting and cleaning a fiber connector of claim 6, further comprising:
   a mirror pivotally mounted in the open access space between the connector holder and the front panel of the housing, wherein the angle of the mirror is adjustable for viewing the ferrule endface in the mirror; and
   an LED lamp mounted on the front panel for illuminating the ferrule endface of the fiber connector.

8. The apparatus for simultaneously inspecting and cleaning a fiber connector of claim 5, further comprising:
   a mirror pivotally mounted in the open access space between the connector holder and the front panel of the housing, wherein the angle of the mirror is adjustable for viewing the ferrule endface in the mirror; and
   an LED lamp mounted on the front panel for illuminating the ferrule endface of the fiber connector.

9. An apparatus for simultaneously inspecting and cleaning a fiber connector, comprising:
   a housing having a base plate and a front panel, the front panel having a lower portion connected to the base plate;
   a microscope system embedded inside the housing, wherein the microscope system has an objective, an optical axis, and a camera, wherein a front window of the objective is exposed through an opening in the front panel;

a connector holder disposed at a certain distance in front of the front panel, defining an open access space between the connector holder and the front panel, the connector holder having a connector receptacle embedded therein for receiving and holding a connector ferrule of a fiber connector so that a ferrule endface of the connector ferrule and fiber endfaces in the ferrule endface are exposed in a rear window of the connector receptacle, facing the front panel, wherein the connector receptacle is substantially aligned with the optical axis of the microscope system so that the ferrule endface and the fiber endfaces of the fiber connector may be viewed and inspected through the microscope system and cleaned via the open access space; and a translation stage disposed inside the housing and coupled with the microscope system for moving the microscope system and the optical axis thereof transversely relative to the connector receptacle of the connector holder to allow the optical axis to be aligned with any selected point along a horizontal track on the ferrule endface of the fiber connector.

10. The apparatus for simultaneously inspecting and cleaning a fiber connector of claim 9, further comprising:
a mirror pivotally mounted in the open access space between the connector holder and the front panel of the housing, wherein the angle of the mirror is adjustable for viewing the ferrule endface in the plane mirror.

11. The apparatus for simultaneously inspecting and cleaning a fiber connector of claim 10, further comprising:
an LED lamp mounted on the front panel for illuminating the ferrule endface of the fiber connector.

12. The apparatus for simultaneously inspecting and cleaning a fiber connector of claim 9, further comprising a hand knob attached to a fine screw that extends through a top side of the connector holder to interact with the connector receptacle of the connector holder, such that the connector receptacle is gradually raised or lowered by turning the hand knob for aligning the ferrule endface of the fiber connector received in the connector receptacle with the optical axis of the microscope system along a vertical track.

13. The apparatus for simultaneously inspecting and cleaning a fiber connector of claim 12, further comprising:
a mirror pivotally mounted in the open access space between the connector holder and the front panel of the housing, wherein the angle of the mirror is adjustable for viewing the ferrule endface in the mirror; and
an LED lamp mounted on the front panel for illuminating the ferrule endface of the fiber connector.

14. The apparatus for simultaneously inspecting and cleaning a fiber connector of claim 9, wherein the translation stage comprises a stationary portion, a moving platform, and a stepper motor, wherein the microscope system is mounted on the moving platform and the stepper motor is able to move the moving platform transversely relative to the stationary portion.

15. The apparatus for simultaneously inspecting and cleaning a fiber connector of claim 9, wherein the microscope system further comprises a beam splitter, an LED light source, and a condenser lens for condensing light from the LED light source and directing the light towards the beam splitter.

16. The apparatus for simultaneously inspecting and cleaning a fiber connector of claim 9, wherein the microscope system further comprises a mechanism for manual focusing and a mechanism for auto-focusing.

17. The apparatus for simultaneously inspecting and cleaning a fiber connector of claim 16, wherein the mechanism for auto-focusing of the microscope system comprises a stepper motor, two focus limit switches, a motor detection control unit, and a triggering arm, wherein
the triggering arm is moved together with a portion of the microscope system by the stepper motor while performing auto-focusing in a direction; and
if the triggering arm is moved to hit either of the two focus limit switches without finding a focus, a signal will be sent to the motor detection control unit, which then sends a signal to reverse the stepper motor to perform auto-focusing in the opposite direction.

18. The apparatus for simultaneously inspecting and cleaning a fiber connector of claim 9, wherein the mirror is a plane mirror or a convex mirror.

* * * * *